UNITED STATES PATENT OFFICE.

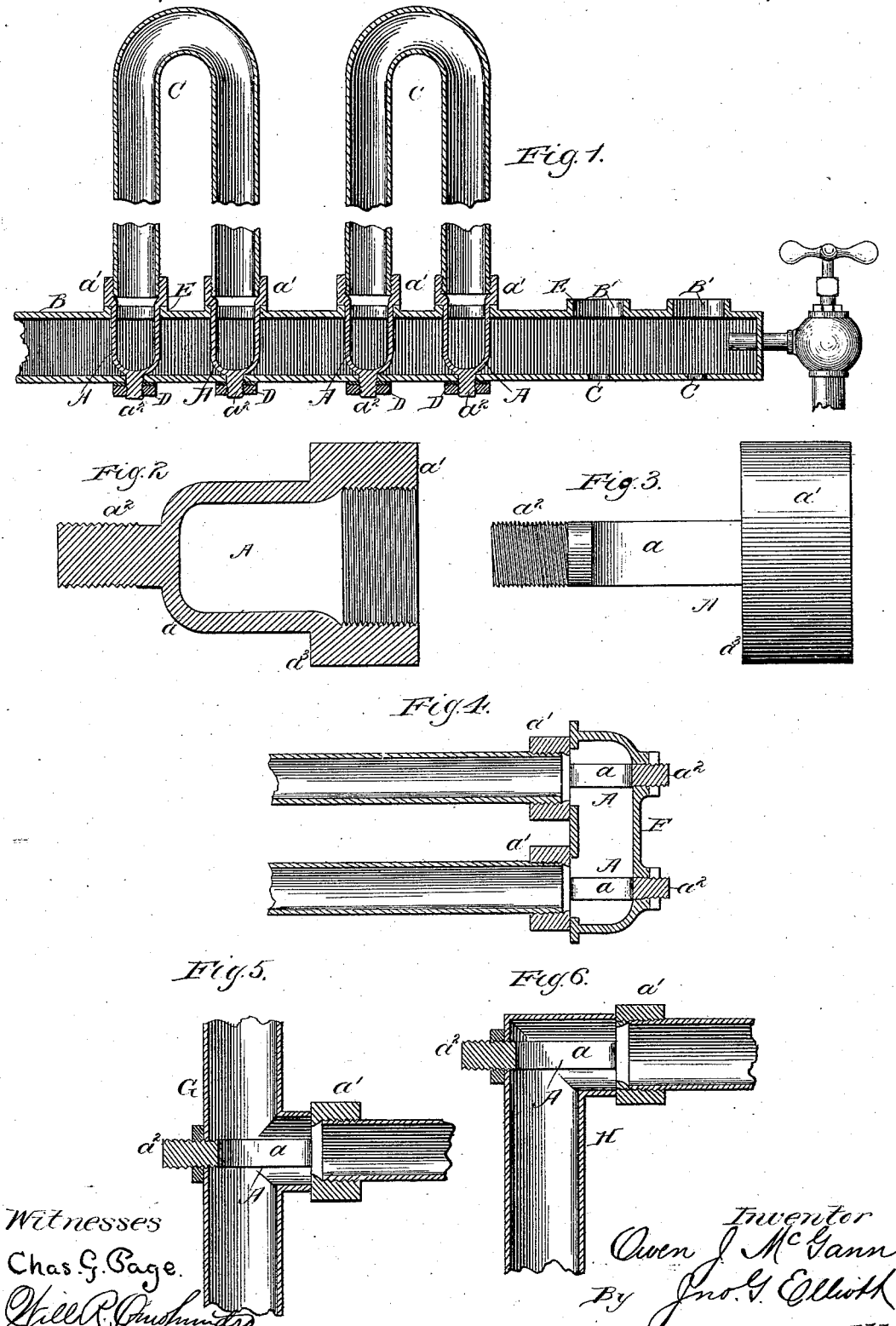

OWEN J. McGANN, OF PULLMAN, ILLINOIS, ASSIGNOR OF ONE-HALF TO JOHN L. VANDERMARK, OF SAME PLACE.

UNION-RETURN FOR PIPES.

SPECIFICATION forming part of Letters Patent No. 307,315, dated October 28, 1884.

Application filed December 17, 1883. (No model.)

*To all whom it may concern:*

Be it known that I, OWEN J. McGANN, a citizen of the United States, residing in Pullman, county of Cook, and State of Illinois, have invented certain new and useful Improvements in Union-Returns for Pipes, of which the following is a specification.

This invention relates to an improvement in means for connecting steam, gas, or water pipes or tubes with the chambers or passages in steam radiators or heaters, tube-heads of sectional boilers, return-unions, and other analogous joints.

Heretofore in a sectional steam-boiler the chambers in a pair of opposing "tube-heads" have been connected together by one or more sets of tubes, arranged with their ends extending into or through one wall of each tube-head, and engaged by couplings which were confined within the chambers of the tube-heads and bolted by tie-bolts to hand-hole plates secured to the tube-heads at points opposite the openings provided for the ends of the tubes. The coupling in such instance has consisted of a flat internally-threaded ring adapted to screw on the threaded end of a tube, and provided with arms converging from one edge of the ring to a point where they unite to form a hub, through which the tie-bolt has been passed up to its head, in which way the threaded end of the tie-bolt could be passed through the hand-hole plate, and a nut then fitted on the threaded end of the tie-bolt, and tightened up against the said plate; but under such construction an end of the tube has been either fitted in an opening formed through one of the sides of the tube-head, and the threaded ring of the coupling adjusted on the end of the tube from within the chamber and fitted in a seat formed by an enlargement or offset at the inner end of the opening through the side of the tube-head, or the end of the tube has been passed through the side of the tube-head, so as to project within the chamber in the latter, and the threaded ring of the coupling adjusted on the threaded end of the tube from within the chamber and then tightened up against the inner wall thereof. In either of said instances, however, the construction of the coupling has required the provision in the tube-head of a hand-hole and a hand-hole plate for closing the same, so that by removing the plate the coupling could be introduced within the tube-head in order to connect it with the tube, in which way a large number of hand-holes and plates therefor were necessitated, thereby not only adding to the cost of the boiler and weakening its construction, but also necessitating the manipulation of a number of hand-plates in connecting or disconnecting the tubes with or from the tube-heads. In addition to such objectionable feature in couplings required to be introduced through hand-holes, it will be obvious that hand-holes and plates therefor would be next to impracticable in a return-union consisting of a small casting adapted to connect together two ends of a pair of pipes.

The object of my invention is to obviate the necessity of providing a hand-hole and a plate therefor, in order to admit of the connection of the coupling with the pipe and with the wall of the chamber or passage, to admit of the introduction of the coupling into the chamber or passage through the opening with which the pipe engaged by the coupling is held in register, so as to establish a connection through said openings between the pipe and the chamber or passage, and to construct the coupling so that after it has been introduced into the chamber or passage and connected at its inner end with one of the sides thereof the outer threaded end portion of the coupling shall be external to the chamber or passage and connected with the threaded end of a pipe at a point outside of the passage or chamber, with said outer end portion of the coupling drawn inwardly against a seat which is external to the passage or chamber. To such end I construct the coupling with a yoke provided with a central bolt or stem designed to be inserted through a perforation in the wall of a chamber or passage with which a pipe is to be connected, and at its base provided with an internally-threaded ring adapted to form an annular shoulder in the coupling at and around the junction of the yoke and the ring, whereby the yoke can be introduced through an opening in one of the sides of the chamber or passage, so as to bring the annular shoulder up against the said side, and also so as to pass the end of the bolt or stem through a perforation formed in the side of the chamber or passage opposite the side in which the opening for the coupling is located, in which way the threaded ring will lie outside of the chamber or passage, and can be held seated on a seat external to the chamber or passage, thereby admitting of the coupling being connected with the walls of the chamber or passage through the medium of the opening usually required for establishing a connection between the pipe and the said chamber or passage, and also admitting of the pipes being connected with or disconnected from the chamber or passage without necessitating either the insertion of the end of the pipe through the side of the chamber or passage or of requiring the coupling to be introduced into the latter through a hand-hole.

Figure 1 represents a section taken on a vertical plane through a steam-radiator, in which the pipes are shown connected with the box in accordance with my invention. Figs. 2 and 3 respectively represent on an enlarged scale a central longitudinal section and a side view of the coupling device with which the end of a pipe is to be connected. Fig. 4 is a section taken through the end portions of two pipes connected with a return-union in accordance with my invention. Fig. 5 shows in section the end portion of a pipe connected with a T-joint, and Fig. 6 illustrates a pipe connected with an elbow in accordance with my improvement.

The principal feature of my invention, which is shown in all of the several figures of the drawings, consists of a coupling or connecting device, A, adapted to be connected with the terminal of a pipe, and also to be secured to the casing of a radiator, a return-union, or any required pipe joint or union. This coupling consists of a yoke-shaped body, $a$, uniting at the terminals of the yoke with an internally-screw-threaded sleeve or socket, $a'$, and provided at its middle with a screw-threaded shank or stem, $a^2$. The yoke unites at its ends or base with the ring at points sufficiently back from the perimeter of the ring, at one edge or end of the latter, so as to leave at said end or edge a flat annular shoulder, $a^3$, and to widen this seat the ring is flanged at this end, thereby forming a suitable annular shoulder, which, when the coupling is employed, shall seat against the outer side of one of the walls of a chamber or passage, and around an opening through which the yoke passes into said chamber or passage. The sleeve or socket portion of this connecting device is adapted to receive the screw-threaded end of a pipe, while its screw-threaded stem is adapted to receive a nut or nuts for holding the coupling device in place. (Shown in Fig. 1, and also in the last three figures of the drawings.)

In Fig. 1, B represents the box of a steam or hot-air radiator, and C the bent or return pipes connected with the said box by means of the couplings A, each of which is fitted in the box, and connected with a terminal of one of the pipes. In this instance the box will be provided in its top with openings B' equal in diameter to the greatest diameter of the yoke portion of the coupling, and in its bottom has holes for receiving the screw-threaded stem of the coupling, so that the couplings connected with the terminals of the pipe can be fitted in the box, and held therein by means of nuts D, fitted on the screw-threaded stems of the couplings, and tightened up against the box, as shown. The diameter of the socket or sleeve portion of the couplings A is greater than the greatest diameter of the yoke; or the sleeve is otherwise formed so as to provide a shoulder, $a^3$, which, when the coupling is fitted in the box, shall seat upon a boss, E, formed on the top of the box around the opening therein, and thereby allow a tight joint to be made between the box and the couplings. It will be seen that the sleeve of the coupling forms a continuation of the passage through the pipe, and that the yoke shape of the body of the coupling admits of a free communication between such passages and the interior of the box.

In Fig. 4 two pipes are shown connected with a return-union, F, by means of the coupling A. In this instance a coupling is screwed on the end of each pipe, and the screw-threaded stems of the two couplings passed through openings in the side of the return-union, after which nuts are fitted on the stems and tightened up against the outer side of the metal shell which composes the said return-union. This latter member is provided at one side with openings for the screw-threaded stems of the couplings, and at the opposite side provided with openings registering with the oppositely-located openings, but having a larger area, in order to admit of the yoke-shaped body of the coupling being inserted in the return-union, against which latter the shoulder of each coupling will be held when the parts are connected to form a joint, as shown. In this connection it will be seen that either pipe can be disconnected from the return-union without disturbing the other pipe, which will obviously be advantageous where a number of pipes are employed—as in steam-heaters, in which two adjacent pipes are connected at their ends with a return-union, one of the said pipes being connected at the opposite end with a return-union, to which a pipe of the next pair will also be connected. If in such case the pipes were screwed directly into the return-union, a pipe, for example, in the middle of the set of pipes could not be taken out without removing all of the preceding pipes, while by connecting the pipes with the return-union by couplings, as described, the nuts can be loosened and the disconnection of one or more pipes at any part of the set be readily effected. In the last two figures of the drawings the coupling is shown as a means for connecting a pipe with a T-joint or an elbow.

In Fig. 5 the T-joint G is provided at a point opposite its middle branch with an opening for the screw-threaded stem of the coupling, which latter is inserted in the T-joint up to its shoulder, and then held therein by a nut tightened up on its stem against the joint. In this case, as in all of the preceding figures, the internally-screw-threaded sleeve portion of the coupling and the pipes are screwed together.

In Fig. 6 the elbow H has an opening for the stem of the coupling at a point opposite the passage in one of its arms, and the pipe is screwed into the coupling, which is connected with the elbow in the same manner as in the preceding figures.

From the foregoing it will be seen the coupling is in the nature of a skeleton frame having an internally-screw-threaded socket or sleeve at one end for engaging the pipe, and at its opposite end a screw-threaded stem capable of receiving a nut, by which the coupling is held in connection with the box of a radiator, a return-union, or other analogous joint; also, that the yoke-shaped portion of the coupling is placed in the passage with which it is desired to connect the pipe, and hence that when the said parts are in proper connection communication between the said passage and the pipe shall be established.

In the instance hereinbefore referred to, in which a coupling has been introduced through a hand-hole in the side of one of the tube-heads of a sectional boiler, the yoke formed by arms extending from one edge of the internally-threaded ring and uniting at their outer ends to form a perforated hub has been provided with a stem consisting of a bolt passing through said hub up to the head of the bolt. I prefer, however, in my coupling to cast the bolt or threaded stem in one piece with the yoke and ring, although I do not limit myself to such feature.

It will be seen that by reason of the annular shoulder $a^3$ in my coupling the yoke and stem can be inserted into a chamber or passage through an opening in one of the walls thereof, and that it can be passed into the same up to the annular shoulder $a^3$, which latter can be drawn tightly against a seat formed around the opening through which the yoke passes. In this way the threaded ring is external to the chamber or passage, and also the pipe connected with the ring at a point external to the chamber or passage with which it is desired to connect the pipe; hence the coupling can not only be employed for connecting tubes with the tube-heads in sectional boilers, but can also be employed for connecting pipes with passages in a variety of apparatus, as hereinbefore set forth.

Having thus described my invention, what I claim, and desire to secure by Letters Patent, is—

1. A coupling for the purposes described, consisting of a yoke provided with a central stem, and at its base provided with an internally-threaded ring constructed to form an annular shoulder in the coupling at and around the junction of the yoke with the ring, substantially as set forth.

2. A pipe system and a chamber connecting two or more of said pipes, in combination with a coupling consisting of a yoke, a stud, and ring thereon, said yoke projecting in the chamber and its stud through one wall thereof, a nut working upon said stud and bearing against the outside of said wall, and the ring bearing against the outside of the opposite wall, whereby the seating of the coupling is entirely upon the outside of and the chamber is tightened against the coupling, and the pipe is relieved from strain when tightening the coupling, substantially as described.

OWEN J. McGANN.

Witnesses:
W. W. ELLIOTT,
CHAS. G. PAGE.